(12) United States Patent
Furthmann et al.

(10) Patent No.: US 11,858,744 B2
(45) Date of Patent: Jan. 2, 2024

(54) CONVEYOR WITH CLAMPING CONNECTION AND METHOD FOR OPERATING A CONVEYOR

(71) Applicant: Aumund Fördertechnik GmbH, Rheinberg (DE)

(72) Inventors: Reiner Furthmann, Rheinberg (DE); Christian Kirschniok, Moers (DE)

(73) Assignee: Aumund Fördertechnik GmbH, Rheinberg (DE)

( * ) Notice: Subject to any disclaimer, the term of this patent is extended or adjusted under 35 U.S.C. 154(b) by 0 days.

(21) Appl. No.: 17/592,445

(22) Filed: Feb. 3, 2022

(65) Prior Publication Data
US 2022/0250850 A1 Aug. 11, 2022

(30) Foreign Application Priority Data
Feb. 5, 2021 (EP) .................................. 21155536

(51) Int. Cl.
| | | |
|---|---|---|
| *B65G 17/08* | (2006.01) | |
| *B65G 43/02* | (2006.01) | |
| *F16G 3/00* | (2006.01) | |
| *F16G 3/08* | (2006.01) | |

(52) U.S. Cl.
CPC ........... *B65G 17/086* (2013.01); *B65G 43/02* (2013.01); *F16G 3/003* (2013.01); *F16G 3/08* (2013.01); *B65G 2203/042* (2013.01); *B65G 2207/30* (2013.01); *Y10T 24/166* (2015.01)

(58) Field of Classification Search
CPC ..... Y10T 24/16; Y10T 24/1684; F16G 3/003; F16G 3/08; F16G 3/09; F16G 3/06; B65G 17/126; B65G 17/086; B65G 43/02; B65G 2203/042; B65G 2207/30
USPC ........................ 198/844.2; 24/33 L, 37, 31 L
See application file for complete search history.

(56) References Cited

U.S. PATENT DOCUMENTS

| | | | | |
|---|---|---|---|---|
| 3,656,137 | A * | 4/1972 | Ratz | B65G 43/02 340/676 |
| 4,540,389 | A * | 9/1985 | Ramsey | F16G 3/06 24/37 |
| 4,587,852 | A | 5/1986 | Butler et al. | |
| 6,047,814 | A * | 4/2000 | Alles | B65G 43/02 198/810.02 |
| 7,810,219 | B2 * | 10/2010 | Lindemann | F16G 3/08 24/37 |
| 2009/0194391 | A1 | 8/2009 | Lagneaux | |

(Continued)

FOREIGN PATENT DOCUMENTS

| | | |
|---|---|---|
| DE | 3001027 A1 | 7/1981 |
| DE | 3406333 A1 | 8/1985 |
| EP | 0806379 A2 | 11/1997 |

(Continued)

*Primary Examiner* — James R Bidwell
(74) *Attorney, Agent, or Firm* — Calfee, Halter & Griswold LLP

(57) ABSTRACT

The present invention relates to conveyors, comprising at least one circulating conveyor strand (7, 8), wherein the conveyor strand has at least one clamping connection (1), wherein at least one sensor (2) is arranged in the clamping connection (1), a transmitter (3) for wirelessly transmitting data is arranged on the conveyor strand (7, 8), the sensor (2) is connected with the transmitter (3), and a receiver (4) for receiving the data transmitted by the transmitter (3) is provided.

15 Claims, 3 Drawing Sheets

(56) References Cited

U.S. PATENT DOCUMENTS

Figure 1:
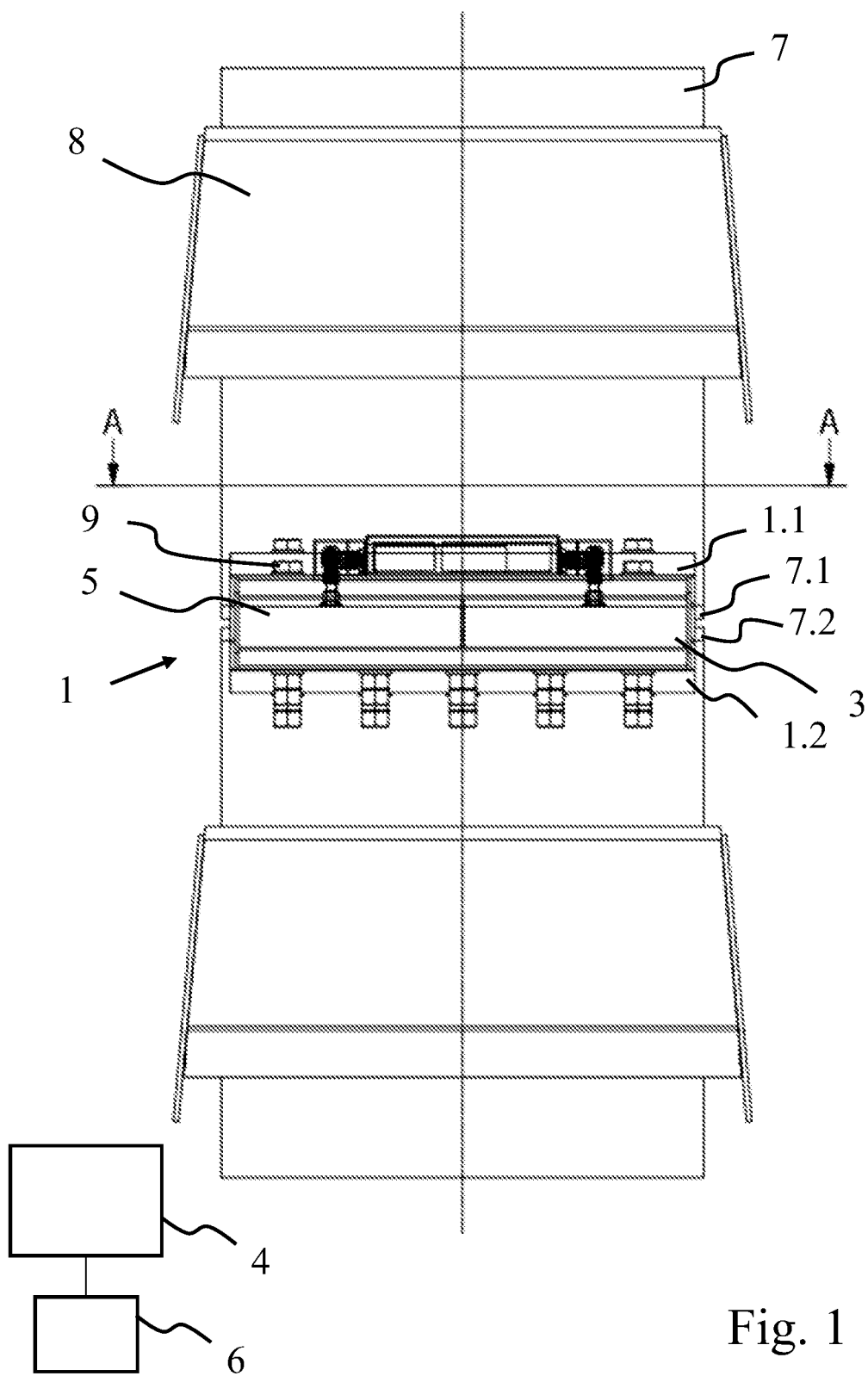

2010/0065405 A1* 3/2010 Lagneaux ............... G01L 5/101
                                                        198/853

FOREIGN PATENT DOCUMENTS

| EP | 2870084 B1 | | 4/2016 | | |
|----|------------|---|--------|---|---|
| GB | 2142146 | * | 1/1985 | ............... | G01L 5/10 |
| JP | 5279406 B2 | | 9/2013 | | |
| KR | 1020180083698 A | | 7/2018 | | |

* cited by examiner

CONVEYOR WITH CLAMPING CONNECTION AND METHOD FOR OPERATING A CONVEYOR

The present invention relates to a conveyor, and in particular to a bucket belt conveyor, wherein the conveyor comprises at least one circulating conveyor strand, and the conveyor strand has at least one clamping connection. The invention also relates to a method for operating a conveyor.

Such a conveyor can be designed as a bucket belt conveyor, in which the conveyor strand has a self-contained, circulating belt, to which buckets are fastened as the conveying means. The ends of the belt are connected with each other by means of a clamping connection to yield a self-contained configuration. For example, such a bucket belt conveyor is known from EP 2 870 084 B1.

The state of the belt and of the clamping connection is inspected on site at regular intervals by trained personnel. Such inspections are to be performed in short intervals in particular after commissioning, and associated with a high (personnel) expenditure.

Therefore, the object of the present invention is to eliminate the disadvantages described with respect to prior art, and in particular to indicate a conveyor and a method for operating such a conveyor, with which the state of the conveyor strand can be monitored with less of an expenditure.

The object is achieved by a conveyor and a method with the features of the respective independent claim. Advantageous further developments of the conveyor and the method are the subject of the dependent claims and the specification, wherein individual features of the advantageous further developments can be combined with each other in a technically sensible manner. In particular, the features disclosed with regard to the conveyor are applicable to the method and vice versa.

In particular, the object is solved by a conveyor with at least one circulating conveyor strand, wherein the conveyor strand has at least one clamping connection, and wherein at least one sensor is arranged in the clamping connection. It is further proposed that a transmitter for wirelessly transmitting data is arranged on the conveyor strand, which is connected with the sensor, wherein a receiver for receiving the data transmitted by the transmitter is also provided, and the receiver is arranged stationarily relative to the circulating conveyor strand.

In particular, the object is also solved by a method for operating a conveyor, comprising at least the following steps:
- conveying conveyed goods by means of a circulating conveyor strand,
- measuring a parameter of a clamping connection of the conveyor strand,
- wirelessly transmitting the measured parameter by means of a transmitter moved with the conveyor strand, and
- receiving the transmitted parameters by means of a receiver.

In particular, the conveyor strand comprises at least one self-contained, circulating belt. In one embodiment, it can here be provided that the belt itself be designed as a conveying means. In this case, the conveyor is a belt system. However, it can also be provided that a conveying means (for example, bucket) be fastened to the belt. In this case, for example, the conveyor is designed as a bucket belt conveyor.

However, it can also be provided that the conveyor strand has a (link plate) chain as the traction means, to which chain conveying means can be attached.

Accordingly, the conveyor is thus in particular a continuous conveyor with or without traction means.

In particular, the conveyor is designed to convey bulk materials.

In order to form a self-contained belt, the two ends of precisely one belt can be connected with each other via a clamping connection. However, it can also be provided that the ends of several belts each be connected with each other by a clamping connection to form a self-contained belt or a self-contained belt system.

In principle, however, the clamping connection could also connect other elements of the conveyor strand with each other.

In particular, a clamping connection is understood as a connection in which the at least one element to be connected is clamped between in particular two clamping elements (later also referred to as clamping jaws), preferably in a friction-locked manner. Two elements to be connected with each other (for example, the two ends of a belt) are preferably pressed against each other in a friction-locked manner between at least two clamping elements. To this end, the clamping elements generate a clamping force, which acts on the at least one element to be connected. To this end, in particular at least one, preferably several screw(s) (or threaded rods) can be provided, which the clamping elements act upon with a clamping force.

In particular, the clamping connection between the ends of a belt or between two belts has a first clamping jaw and a second clamping jaw, between which two ends are arranged, wherein at least one sensor is arranged between one clamping jaw and the belt. The ends of the belt or the belts can here be angled roughly orthogonally to the circulating direction of the belt, and are pressed onto each other by the two clamping jaws. As a consequence, for example, a measured variable such as pressure, traction, deformation between the clamping jaw and the belt can be directly measured. For example, several sensors within a clamping connection can measure a measured variable at several locations of the clamping connection, from which a force distribution can be derived, for example.

Such a clamping connection can also comprise a third clamping jaw, which is arranged between the ends of the belt or the belts, wherein at least one sensor is arranged between the third clamping jaw and the belt. The third clamping jaw extends into the clamping connection, in particular proceeding from the inside of the circulating belt, and has rounded portions on the inner side of the belt that support the unwinding of the ends of the belt strap to the circulating direction. Such a third clamping jaw is also referred to as a core piece.

In particular, a pressure sensor, a traction sensor, a deformation sensor and/or a temperature sensor can be arranged in the clamping connection.

It is now provided in particular that the at least one sensor circulating with the conveyor strand be used to determine parameters (for example, pressure and/or temperature) of the clamping connection, and transmit these parameters cordlessly/wirelessly to the receiver that is stationary relative to the circulating conveyor strand by means of the transmitter that likewise circulates with the conveyor strand. Therefore, it is no longer necessary that the conveyor be stopped for each inspection.

It is here preferred that the receiver be arranged immediately adjacent (meaning within several meters) to the circulating conveyor strand. The advantage to this is that the transmitter only requires a comparatively small transmitting power to transmit data to the receiver. As a consequence, the transmitter can be equipped with a comparatively small energy supply that circulates with the conveyor strand (for example, a battery or accumulator), while simultaneously ensuring a power supply for a long time. In this case, for example, the wireless data transmission from the transmitter to the receiver can take place by means of a short-range transmission technology, such as infrared, Bluetooth or WLAN. For example, the data can be transmitted when the transmitter passes by the receiver.

In principle, however, it would also be conceivable to transmit the data determined by the sensor to a receiver set up further away by means of a long-range transmission technology, for example via radio, the mobile network, or satellites.

In a preferred embodiment, it can also be provided that the conveyor strand has arranged on it a (computer-assisted) data processing unit that circulates with the conveyor strand, and is connected with the sensor and the transmitter. For example, the parameter determined by the sensor can be cached in the first data processing unit, and be discontinuously transmitted to the receiver arranged stationarily adjacent to the conveyor strand during operation by means of the transmitter. In a further development, however, the first data processing unit can also perform a first assessment of the measured parameters, and initiate a (for example, optical or acoustic) signal upon determining a critical value.

Another embodiment can provide that the conveyor has a (second) data processing unit, which is connected with the receiver, and likewise arranged stationarily relative to the circulating conveyor strand. This (second) data processing unit can have a memory for storing the parameter determined by the sensor and transmitted by means of the transmitter. This (second) data processing unit can additionally or alternatively have an evaluation unit, with which the parameters determined by the sensor are evaluated. It can additionally or alternatively be provided that the second data processing unit have an interface for transmitting the received, evaluated and/or cached data to an external evaluation unit.

For example, this interface can be a wired interface, so that a person charged with maintenance can read out the data determined over a prolonged period during operation of the conveyor, and decide on site whether maintenance is required. As a consequence, it can be ensured that the data not be accessible via the internet.

Alternatively, the interface can be set up for wireless transmission. For example, the data can then be transmitted by the second data processing unit to an external evaluation unit regularly, irregularly or on demand. For example, the (second) data processing unit can have transmitters based on short-range transmission technology or a transmitter based on long-range transmission technology, and transmit the stored data to a higher-level evaluation unit. In this way, a diagnosis of the state of the conveyor strand can be made remotely.

During the evaluation of the measured parameters, in particular the measured parameter is compared with a prescribed extreme value, wherein a signal is generated if the extreme value was found to have been exceeded or dropped below. Based in particular on the chronological progression of the pressure in the clamping connection, in particular in combination with the chronological progression of the temperature, the state of the clamping connection or the belt can be determined, as can whether maintenance is required. The chronological progression of the parameters can here be compared with prescribed values. However, it would also be conceivable to train an artificial intelligence, which would automatedly perform the evaluation. The chronological progression of the measured values is here evaluated in particular over several days, weeks and months. In this case, a chronologically abnormal progression of the parameter can also be detected as a critical value.

Figure 2:
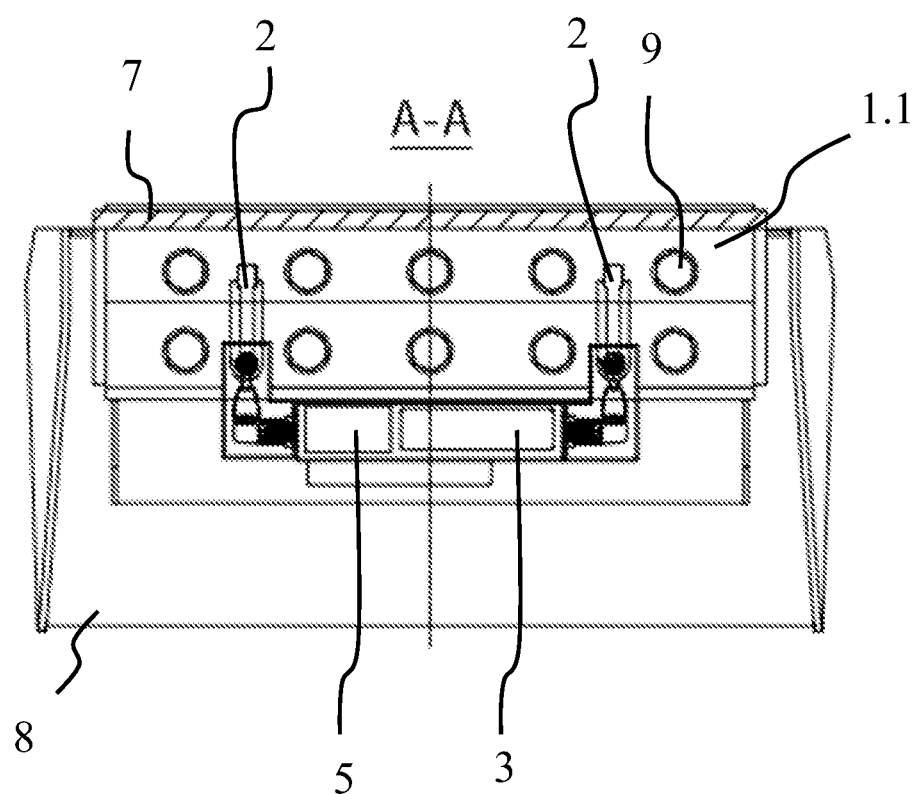
Figure 3:
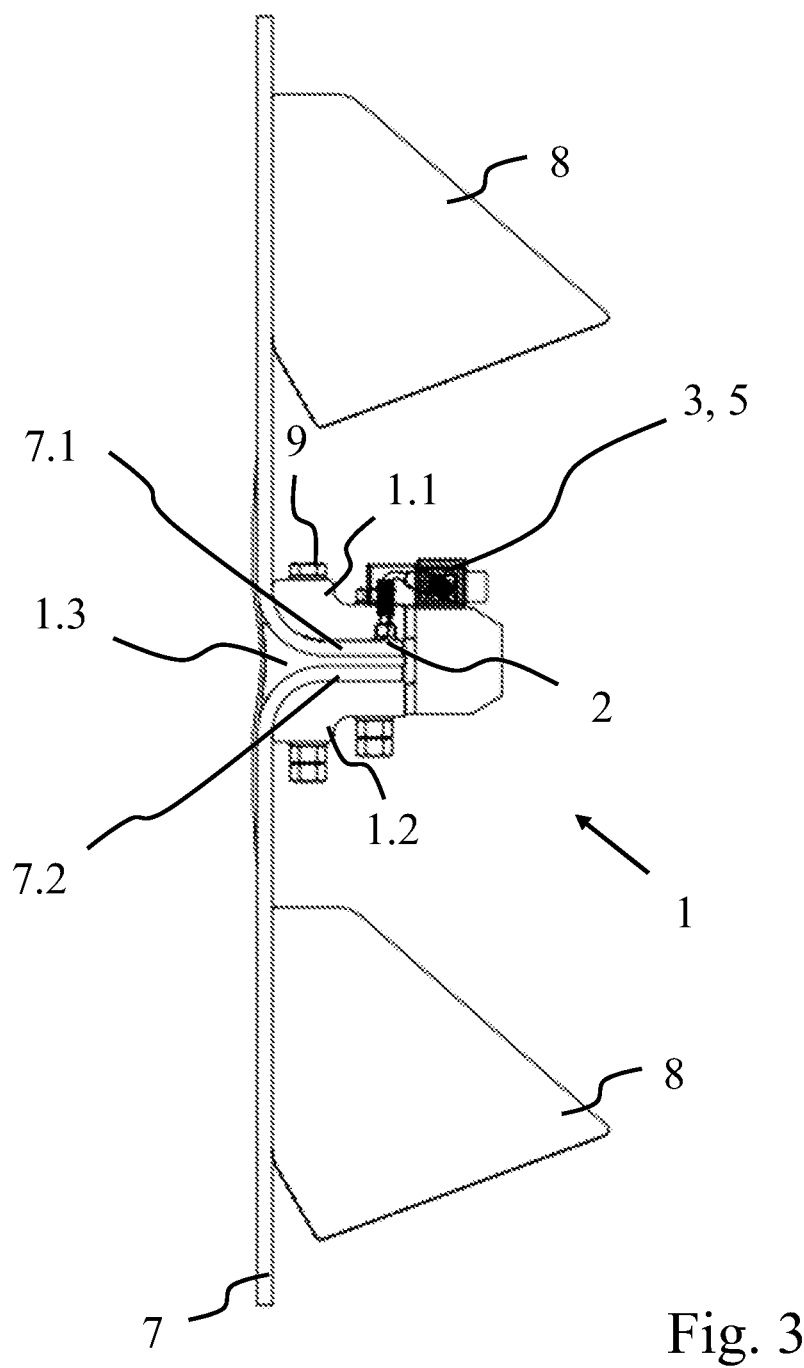

The invention along with the technical background will be exemplarily described below based on the figures. Shown schematically on:

FIG. 1: is a top view of a bucket belt conveyor with a conveyor strand having a self-contained, circulating belt, buckets and a clamping connection, as well as with a receiver, FIG. 2: is a view of the clamping connection between the ends of the belt, and FIG. 3: is a side view of the conveyor strand.

FIG. 1 shows a conveyor, which has a conveyor strand as well as a receiver 4 connected with a second data processing unit 6.

The conveyor strand of the conveyor comprises a belt 7, wherein the first end 7.1 and the second end 7.2 of the belt 7 are connected with each other by means of a clamping connection 1. Buckets 8 are fastened to the belt 7 as another component of the conveyor strand (see also FIG. 2).

As evident in particular from the side view of FIG. 3, the clamping connection 1 comprises a first clamping jaw 1.1, a second clamping jaw 1.2 and a third clamping jaw 1.3. The first end 7.1 of the belt 7 is arranged between the first clamping jaw 1.1 and the third clamping jaw 1.3, while the second end 7.2 of the belt 7 is arranged between the second clamping jaw 1.2 and the third clamping jaw 1.3. The clamping jaws are braced by means of several screws 9, causing a clamping force to act on the ends 7.1 and 7.2 of the belt 7.

It is now provided that two sensors 2 be arranged between the first clamping jaw 1.1 and the first end 7.1 of the belt 7. The sensors 2 are connected with a transmitter 3 and a first data processing unit 5. The transmitter 3 and the first data processing unit 5 are integrated into a housing, which is fastened to the first clamping jaw 1.1.

The sensors 2 can be designed as a pressure sensor, deformation sensor or temperature sensor. During operation of the conveyor strand, parameters of the clamping connection 1 can thus be determined continuously, and can be stored on the first data processing unit 5. If the clamping connection 1 runs along the stationary receiver 4 during operation, the data stored on the first data processing unit 5 can be wirelessly transmitted to the receiver 4 by means of the transmitter 3. The data received by the receiver 4 can be stored on the second data processing unit 6. The data stored on the second data processing unit 6 can either be read out locally by a service employee, or be transmitted to a higher-level control unit by means of an undepicted transmitting unit. The measured parameters can in this way be compared with prescribed extreme values, making it possible to infer the state of the clamping connection 1. In this way, it is no longer necessary that the clamping connection 1 be manually checked by a service employee. Instead, a remote diagnosis can be made, and the clamping connection 1 can be serviced if needed.

REFERENCE LIST

1 Clamping connection
1.1 First clamping jaw
1.2 Second clamping jaw
1.3 Third clamping jaw
2 Sensor 3 Transmitter
4 Receiver
5 First data processing unit
6 Second data processing unit
7 Belt
7.1 First end
7.2 Second end
8 Bucket
9 Screw

The invention claimed is:

1. A conveyor comprising at least one circulating conveyor strand (7, 8), wherein the conveyor strand has at least one clamping connection (1), characterized in that
at least one sensor (2) is arranged in the clamping connection (1), where the sensor determines parameters of the clamping connection (1),
a transmitter (3) for wirelessly transmitting data is arranged on the conveyor strand (7, 8),
the sensor (2) is connected to the transmitter (3), and
a receiver (4) for receiving the data transmitted by the transmitter (3) is provided.

2. The conveyor according to claim 1, wherein a first data processing unit (5) is arranged on the conveyor strand (7, 8), and wherein the first data processing unit (5) is connected to the sensor (2) and to the transmitter (3).

3. The conveyor according to claim 1, wherein the receiver (4) is arranged stationarily relative to the circulating conveyor strand (7, 8) as a component of the conveyor.

4. The conveyor according to claim 1, wherein the conveyor has a second data processing device (6), which is connected to the receiver (4), and which second data processing device (6) is stationarily arranged relative to the circulating conveyor strand (7, 8).

5. The conveyor according to claim 1, wherein the at least one sensor (2) comprises a sensor from the following group:
Pressure sensor,
Traction sensor,
Deformation sensor,
Temperature sensor.

6. The conveyor according to claim 1, wherein the conveyor strand has at least one belt (7).

7. The conveyor according to claim 6, wherein the clamping connection (1) is formed between ends (7.1, 7.2) of the at least one belt (7).

8. The conveyor according to claim 7, wherein the clamping connection (1) comprises a first clamping jaw (1.1) and a second clamping jaw (1.2), between which the ends (7.1, 7.2) of the at least one belt (7) are arranged, wherein the at least one sensor (2) is arranged between a clamping jaw (1.1, 1.2) and the at least one belt (7).

9. The conveyor according to claim 8, wherein the clamping connection (1) comprises a third clamping jaw (1.3), which is arranged between the ends (7.1, 7.2) of the at least one belt (7), wherein the at least one sensor (2) is arranged between the third clamping jaw (1.3) and the at least one belt (7).

10. The conveyor according to claim 1, wherein the conveyor strand comprises a bucket (8).

11. A method for operating a conveyor, comprising at least the following steps:
conveying conveyed goods by means of a circulating conveyor strand,
measuring a parameter of a clamping connection of the conveyor strand,
wirelessly transmitting the measured parameter by means of a transmitter moved with the conveyor strand, and
receiving the transmitted parameters by means of a receiver.

12. The method according to claim 11, wherein the measured parameters are cached in a first data processing unit, and discontinuously transmitted to the receiver during operation by means of the transmitter.

13. The method according to claim 11, wherein the data received by the receiver are stored in a second data processing unit, and only transmitted to an evaluation unit if needed.

14. The method according to claim 11, wherein the measured parameters are compared with prescribed extreme values, and a signal is generated if the extreme values are exceeded or dropped below, and/or wherein the measured parameters are analyzed, and a signal is generated if an anomaly is detected.

15. The method according to claim 11, wherein in particular a pressure is measured as the measured parameter within a clamping connection, and the chronological progression of the parameter over several days, weeks and months is compared with respective critical extreme values, wherein in particular a chronologically abnormal progression of the parameter is also detected as a critical value.

* * * * *